US005637653A

United States Patent [19]
Preston et al.

[11] Patent Number: 5,637,653
[45] Date of Patent: Jun. 10, 1997

[54] POLYMER BLEND MATERIALS COMPOSED OF AN AROMATIC POLYAMIDE AND A SOLUBLE POLYAMIDE

[75] Inventors: Jack Preston, Raleigh, N.C.; Satoshi Idemura, Sakura, Japan

[73] Assignees: Dainippon Ink and Chemicals, Incorporated, Tokyo, Japan; Research Triangle Institute, Research Triangle Park, N.C.

[21] Appl. No.: 433,254

[22] Filed: May 2, 1995

[51] Int. Cl.$^6$ .................................................. C08L 77/00
[52] U.S. Cl. .................................................. 525/432; 525/420
[58] Field of Search ........................................ 525/432, 420

[56] References Cited

U.S. PATENT DOCUMENTS

| | | |
|---|---|---|
| 2,958,677 | 11/1960 | Kleinschmidt . |
| 4,228,218 | 10/1980 | Takayanagi et al. . |
| 4,994,146 | 2/1991 | Soerens ........................ 162/112 |
| 5,068,292 | 11/1991 | Lenke et al. ................... 525/509 |
| 5,137,728 | 8/1992 | Bawa ............................ 424/427 |
| 5,151,472 | 9/1992 | Valia ............................ 525/432 |
| 5,321,087 | 6/1994 | Ogata et al. ................... 525/184 |
| 5,326,613 | 7/1994 | Stenger ........................ 428/34.8 |

FOREIGN PATENT DOCUMENTS 0381172  9/1990  European Pat. Off. .

OTHER PUBLICATIONS

Journal of Polymer Science: Part A: Polymer Chemistry, vol. 31, pp. 597–602 (1993).

Chem. Mater., vol.4, No.5, pp. 1123–1128 (1992).

J. Macromol. Sci.–Phys., B17(4), 591–615 (1980).

Journal of Polymer Science:Polymer Chemistry Edition, vol.18, 1099–1104 (1980).

Journal of Polymer Science: Polymer Chemistry Edition, vol.18, 2875–2877 (1980).

Journal of Polymer Science: Polymer Chemistry Edition, vol.18, 851–856 (1980).

Polymer Journal, vol.22, No.2, pp.85–91 (1990).

Polyamide Microcomposites Via In–Situ Polymerization of Activated p–Aminobenzoic Acid, pp.370–371.

*Primary Examiner*—Ana Woodward
*Attorney, Agent, or Firm*—Armstrong, Westerman, Hattori, McLeland & Naughton

[57] ABSTRACT

Polymer blend materials composed of an aromatic polyamide and flexible polyamide wherein the aromatic polyamide molecules are uniformly dispersed in a matrix of the flexible polyamide which are produced by first blending the flexible polyamide and monomer(s) for the aromatic polyamide in a solvent, then next polymerizing the monomer(s) in the presence of a phosphite compound, resulting in a transparent gel product capable of being fabricated into useful shaped articles without causing marked phase separation observed in polymer blend materials obtained by conventional coagulation method. The in situ formed aromatic polyamide is uniformly dispersed in the flexible polyamide matrix even in fabricated forms, giving improved transparency over the starting flexible polyamide and improved resistance toward chemicals such as acids, especially after heat treatment.

19 Claims, No Drawings

POLYMER BLEND MATERIALS COMPOSED OF AN AROMATIC POLYAMIDE AND A SOLUBLE POLYAMIDE

BACKGROUND OF THE INVENTION

Polymer blend materials composed of dispersed rigid-rod polymers, such as certain types of aromatic polyamides and a flexible polymer matrix, are gaining increased attention as new materials wherein the host matrix polymer is modified at the molecular level by the incorporation of the rigid-rod polymer in a dispersed form. Such a polymer blend material is expected to exhibit not only some of the benefits of a rigid-rod polymer as regards mechanical properties, thermal stability, resistance toward chemicals, and other properties, but also the benefits of a flexible polyamide, such as moldability. For example, improvement in tensile properties of a flexible polymer by blending a rigid-rod polymer therein has been reported. The exact definition of "rigid-rod" is given by using the term "rigid" in Japan Patent (Not examined) No. 52-131436 and U.S. Pat. No. 4,228,218. All of the polymers which are not rigid-rod ones are defined as flexible polymers. Polymer blend materials, including rigid-rod polymeric molecules dispersed at the microscopic level, are of great interest as novel materials for many applications.

However, it is commonly difficult to disperse one polymer in another polymer. Phase separation or aggregation thermodynamically inevitable. Several efforts have been examined to overcome the difficulty of blending rigid-rod polymers with flexible polymers. A coagulation method is conventionally employed for the preparation of polymer blend materials which include a rigid-rod polymer. In this method, a homogeneous solution including a rigid-rod polymer and a flexible polymer are put rapidly into a poor solvent, resulting in a precipitate of polymer blend materials. The coagulation process is insufficient to achieve the fine dispersion of rigid-rod polymers because entropy-driven demixing might take place during coagulation even though nonequilibrium solidification is expected.

As for polymer blend materials composed of poly(p-phenyleneterephthalamide) [PPD-T] and nylon, which are of concern in the present invention, the formation of 30 nm-diameter microfibrils of PPD-T are observed for blends of PPD-T/nylon obtained by a coagulation method as is previously reported in J. Macromol. Sci. Phys., B17(4), 591 (1980).

Moreover, a coagulation method involves another disadvantage. A rigid-rod polymer such as poly(p-phenyleneterephthalamide) [PPD-T] usually requires strong acids as solvents due to its poor solubility. To prepare homogeneous solutions, a large amount of strong acid solvent, e.g., sulfuric or methanesulfonic acid, must be employed. However, the use of strong acids induces polymer degradation and is not economical for obtaining a large amount of polymer blend materials, especially for industrial processes.

Alternatively, a comparatively new method of blending a rigid-rod polymer in a matrix polymer is known wherein the rigid-rod polymer is synthesized in situ in the presence of the matrix polymer.

In these methods, rigid-rod polymers are synthesized in a dissolved or molten matrix of flexible polymer. For example, Ogata et al. synthesized rigid-rod polyamides such as PPD-T and PBA [poly(p-benzamide)] and rigid-rod polyesters such as PHB [poly(p-hydroxybenzoate)], etc., in the presence of matrix polymers such as polyarylate and elastomers dissolved in chlorohydrocarbons etc., which, however, resulted in a suspension of rigid rod polymer, resulting in opaque films containing large aggregations of 500 nm or more, as is described in Polym. J., 22(2), 85 (1990), Chem. Mater. 4, 1123 (1992), J. Polym. Sci., Part A: Polym. Chem., 31, 597 (1993). Rösch reported that a mixture of PBA and PABC [poly(p-aminobenzoyl- caprolactam)] was formed in situ in a nylon matrix, resulting in a phase separated structure between nylon 6 and PBA/PABC [Polym. Prepr. 33(1), 370 (1992)]. It is true that these attempts are considered to be advantageous in that conventional aprotic solvents or no solvent is employed to produce polymer blend materials including rigid-rod polymers, but such observations led to the conclusion that no fine dispersion of rigid-rod polymers at a nanometer level was obtained which thereby brings about poor transparency.

It is obvious that even with these methods, including the in situ methods conventionally employed to date, entropy driven demixing of polymers occurs to some extent. A production method of the polymer blend materials including rigid-rod polymers without using strong acids and giving uniformly dispersed forms of aromatic polyamides therein has not been established and such systems are still desired.

The present invention relates to polymer blend materials produced by in situ synthesis of a rigid-rod polyamide through the phosphorylation polycondensation reaction in the presence of a soluble polyamide. The phosphorylation polycondensation reaction in the presence of a dissolved polymer matrix has been previously reported as follows. The synthesis in a poly(4-vinylpyridine) matrix and a poly (ethyleneoxide) matrix, respectively, has been described in Journal of Polymer Science: Polymer Chemistry Edition, Vol. 18, 851 (1980), and Journal of Polymer Science: Polymer Chemistry Edition, Vol. 18, 1099 (1980). The synthesis in the matrices of poly(vinylpyrrolidinone), poly (4-vinylpyridine) and poly(ethyleneoxide) has been described in Journal of Polymer Science: Polymer Chemistry Edition, Vol. 18, 2875 (1980).

However, these methods are quite different from the present invention. In particular, polyamides are not employed as matrix polymers, the matrix polymers are merely employed as reaction promoters to produce high-molecular-weight aromatic polyamides, and improved transparency and improved resistance toward chemicals of resultant polymer blend materials over the starting matrix polymers, which were discovered in the present invention, are not mentioned. Additionally, transparent gel formation during the synthesis and fine dispersion of the synthesized aromatic polyamides in the matrix polymers, which were discovered in the present invention, are not mentioned. Furthermore, the polymers which are employed are water soluble, and therefor do not remain in the final product.

The above mentioned in situ reaction was conducted by using N-methyl-2-pyrrolidinone ("pyrrolidinone" is also referred to as "pyrrolidone") as a solvent suitable for the phosphorylation reaction and capable of dissolving the matrix polymers. Although it is known that polyamides such as nylon 6 could dissolve in amide type solvents at the boil such as N-methyl-2-pyrrolidinone as was described in U.S. Pat. No. 2,958,677, however, the in situ synthesis through the phosphorylation reaction in the presence of polyamides such as nylon 6 has not been examined.

It should be mentioned that the present invention is mainly aimed towards a polymer blend material composed of a rigid-rod aromatic polyamide and a flexible aliphatic polyamide. However, the present invention is found to be effective also for a polymer blend material from a nonrigidrod aromatic polyamide and a polyamide which is simply soluble in a certain solvent. Therefore, in a broad sense, the present invention relates to a polymer blend material comprising an aromatic polyamide and a soluble polyamide as the title indicates.

SUMMARY OF THE INVENTION

In the present invention, a new approach was undertaken for producing polymer blend materials in the form of transparent gel products, through an in situ synthesis of aromatic polyamides including rigid-rod polyamides such as PPD-T, PBA, etc., in the dissolved matrices of soluble polyamides such as aliphatic polyamides. The products, after removal of the solvent from the gel, can be categorized into polymer blend materials in the present invention. The above-mentioned gel product with a transparent appearance indicates uniformly incorporated aromatic polyamide molecules, and it may be postulated that those polymeric molecules do not have sufficient mobility to cause entropy driven separation or aggregation demixing which readily occurs in the conventional coagulation method or the conventional in situ approach.

Our approach, given here in the present invention, is an in situ synthesis of aromatic polyamides from monomers which are much more soluble than the polymers, via the phosphorylation polycondensation reaction employing a phosphite as a condensation agent, in soluble polymer polyamide matrices such as aliphatic polyamides.

This approach provides three strong advantages. First, conventional aprotic solvents can be used instead of strong acid solvents for the production of polymer blend materials, especially for those including an aromatic polyamide, such as PPD-T, having poor solubility in organic solvents. Secondly, the in situ formed aromatic polymeric molecules are uniformly dispersed in a soluble polymer matrix at a nanometer level even after being fabricated into useful shaped articles, surprisingly with improved transparency over the starting soluble polyamides. And finally, the polymer blend materials have greatly improved resistance toward chemicals such as acids which are in general capable of dissolving polyamides readily.

DETAILED DESCRIPTION OF THE INVENTION

The phosphorylation polycondensation reaction known as the Yamazaki or Higashi reaction, is used for the in situ synthesis of aromatic polyamides. This type of reaction has not been examined previously with the aim to obtain polymer blend materials from the monomers of an aromatic polyamide in a soluble polymer matrix. The phosphorylation reaction enabled us to synthesize polyamides directly from monomers in the form of diacids without acylation.

In the present invention, an aromatic polyamide may be synthesized from a monomer combination of aromatic dicarboxylic acid(s) and aromatic diamine(s), or may be synthesized from monomer(s) of aromatic amino acid(s).

Typical examples of the combination of aromatic dicarboxylic acid(s) and aromatic diamine(s) include those consisting of the former being selected from at least one aromatic dicarboxylic acid from the group consisting of terephthalic acid, isophthalic acid, and their substituted ring containing derivatives, and the latter selected from at least one aromatic diamine from the group consisting of p-phenylenediamine, m-phenylenediamine, 1,5'-diaminonaphthalene, 1,8-diaminonaphthalene, 2,3-diaminonaphthalene, 3,4'-diaminodiphenylether, 4,4'-diaminodiphenylether, 3,4'-diaminodiphenylsulfone, 4,4'-diaminodiphenylsulfone, 3,4'-diaminodiphenyl methane, 4,4'-diaminodiphenyl methane and their ring substituted and/or N-substituted derivatives. For example, a monomer combination of terephthalic acid and p-phenylenediamine acid may be employed for the aromatic polyamide poly(p-phenyleneterephthalamide [PPD-T]. Additionally, in the present invention, monomers for aromatic polyhydrazides instead of aromatic polyamides, such as a combination of terephthalic acid and p-amino-benzhydrazide for poly(p-phenylene-aminobenzhydrazide) [PABH-T] and a combination of isophthalic acid and p-aminobenzhydrazide for poly (m-phenylene aminobenzhydrazide) can be used.

And, typical examples of said aromatic amino acids include at least one from the group consisting of p-aminobenzoic acid, m-amino-benzoic acid, and their substituted ring containing derivatives. For example, the monomer p-aminobenzoic acid may be employed for an aromatic polyamide poly(p-benzamide) [PBA]. These aromatic amino acids may be used also with a combination of aromatic dicarboxylic acid and aromatic diamine mentioned above.

Before the initiation of the in situ synthesis employing said monomer(s), it is necessary to prepare a reaction medium composed of a solvent, a soluble polyamide which is completely dissolved in the solvent and the monomers for aromatic polyamides described above, and a metal salt(s).

As a solvent, for the reaction medium, amide-type solvents are suitable. Typical examples of solvents are selected from at least one amide type solvent from the group consisting of N-methyl-2-pyrrolidinone, N,N-dimethylacetamide and N,N,N',N'-tetramethylurea.

Tertiary amine(s) may be added to the solvent to promote the reaction. Tertiary amines useful in conducting the in situ reaction include pyridine, imidazole, picoline and lutidine. These tertiary amines may be used as a sole component or in a combined form of two or more, in an amount of up to 50 wt % of the solvent.

It is preferred to add metal salt(s) to the solvent to promote the reaction by increasing the dissolving power of the solvent and to possibly participate in the reaction itself. Examples of metal salts include lithium chloride, calcium chloride, magnesium chloride and zinc chloride, which may be used as a sole component or in a combined form of two or more. These metal salts are usually added in an amount of 1 to 25 weight percent, preferably 4 to 15 weight percent of the amide-type solvent.

In the present invention, soluble polyamides are defined as those soluble in one or more amide-type solvents selected from the group consisting of N-methyl-2-pyrrolidinone (NMP), N,N-dimethylacetamide and N,N,N',N'-tertamethylurea, each containing metal salt(s) in said weight percent at a temperature below 180° C. Typical examples of soluble polyamides are at least one aliphatic polyamide selected from the group consisting of nylon 6, nylon 11, nylon 12, nylon 46, nylon 66, nylon 69, nylon 610, nylon 612 and copolymers thereof, preferably nylon 6 and nylon 66. Copolymers thereof can be used as soluble polyamides. The copolymers include random, block and/or graft copolyamides, between soluble polyamide and between soluble polyamide(s) and other polymer(s). Strictly speaking, in the present invention, a soluble polyamide is categorized from its solubility in the solvent, not a chemical structure. Therefore, if a polyamide or a copolymer thereof that is a rigid-rod polyamide and/or an aromatic polyamide, can dissolve in said solvent, it can be regarded as a soluble polymer for the purposes of the present invention.

Soluble polyamides are preferably used at a concentration of 1 weight percent to 25 weight percent of the amide-type solvent, and at such concentrations as necessary to allow the content of an aromatic polyamide synthesized in situ to be up to 80 weight percent of the resultant polymer blend material after removing the solvent.

Dissolving a soluble polyamide in an amide-type solvent is effectively conducted at a temperature between 80° C. to 170° C. with stirring in the presence of metal salt(s) placed in the solvent. The presence of the metal salt(s) promotes the dissolution. For the purpose of preventing oxidation, dissolving a soluble polyamide is preferably conducted in an atmosphere of an inert gas such as nitrogen. Monomer(s) for an aromatic polyamide may be placed either before or after the dissolving of the soluble polyamide in the solvent. In the case that a tertiary amine is used, it may also be added either before or after the dissolving of the soluble polyamide in the solvent. After the soluble polyamide has completely dissolved, the temperature is kept at a prescribed reaction temperature ranging from 80° C. to 180° C. with the soluble polyamide being completely dissolved in the resulting reaction medium. Thus, a reaction medium for the in situ synthesis of an aromatic polyamide is prepared. The reaction medium may be prepared by synthesizing the soluble polyamide in the solvent before the addition of the monomer(s) for the aromatic polyamide, resulting in a reaction medium.

It should be mentioned that the complete dissolving of monomers in the reaction medium is not always required, because soon after the initiation of the in situ synthesis by the addition of a phosphite compound serving as condensing agent, step-growth polycondensation occurs which allows the dissolution of monomers into the reaction medium, probably in their activated intermediate or oligomerized form.

As described above, a phosphite compound is added to the reaction medium kept at a reaction temperature, then the phosphorylation polycondensation reaction between amino groups and carboxyl groups occurs. A phosphite compound is at least one aryl phosphite selected from the group consisting of triphenylphosphite, diphenylphosphite, tri-o-tolylphosphite, di-o-tolylphosphite, tri-m-tolylphosphite, di-m-tolylphosphite, tri-p-tolylphosphite, di-p-tolylphosphite, tri-o-chlorophenylphosphite, di-o-chlorophosphite, tri-m-chlorophenylphosphite, di-m-chlorophenylphosphite, tri-p-chlorophenylphosphite and di-p-chlorophenylphosphite. These phosphite compounds are preferably added in equimolar amounts to a 10 mol percent excess of the carboxylic acid groups of monomer(s) for the aromatic polyamide to be synthesized. The phosphite compound may be added to the reaction medium all at once or dropwise. In either case, vigorous stirring is used to dissolve droplets of the phosphite compound.

After the addition of a phosphite compound, the reaction proceeds and the reaction mixture becomes viscous, inducing gelation with a transparent appearance usually within 150 minutes. Even after the gelation, the polycondensation reaction continues to some extent, finally resulting in an elastic transparent gel product. In the manner described above, a polymer blend material comprising an in situ synthesized aromatic polyamide in the presence of a soluble polyamide, resulting in an aromatic polyamide uniformly dispersed in the matrix of said soluble polyamide, is produced. When rigid-rod aromatic polyamides such as PPD-T and PBA are synthesized, the formation of rigid-rod chains may be identified by increases in the inherent viscosity values of the resultant polymer blend materials, owing to the fact that rigid-rod polyamides commonly give inherent viscosity values higher than those of soluble (i.e., flexible) polyamides. An inherent viscosity value can be determined in the conventional method described elsewhere.

The formation of the transparent gel product is essential to the present invention, whose immobilized networks prevent entropy driven phase separation of the polymers uniformly incorporated.

The gel product contains the solvent. The gel product may be fabricated into articles, for example, in the form of fiber, powder, film or three-dimensional articles. The fabrication may be done after, before or with removal of the solvent from the gel. For example, in the case of fabricating the gel product into powders, the solvent can be removed by chopping the gel product, washing the gel product in a solvent such as alcohol and water followed by drying it at 50° C. to 100° C. During the removal of the solvent, all the components and byproducts other than the in situ synthesized aromatic polyamide and the soluble polyamide can be removed. The thus obtained polymer blend material in powder form may be further fabricated into useful shaped articles. For example, the powder may be compressed into film at desirable temperatures above the melting point of the soluble polyamide employed.

In the present invention, the degree of the dispersion of the in situ synthesized aromatic polyamide, and an improved resistance of the resultant polymer blend material toward acids are disclosed.

The degree of the dispersion of the in situ synthesized aromatic polyamide can be evaluated by visual observation of film transparency, and more accurately evaluated by a scanning electron microscope of fractured surfaces of films. Needless to say, a more uniform dispersion gives a more transparent appearance. The polymer blend materials obtained in accordance with the present invention exhibit a more transparent appearance compared with those obtained by the coagulation method mentioned before, and surprisingly, with the transparency improved over the starting soluble polyamides. The electron microscopic observation demonstrates a much more uniformly dispersed form of the in situ synthesized aromatic polyamides than those resulting from the coagulation method. No aggregated particles of the aromatic polyamides larger than 10 nm in diameter are identified in the in situ prepared polymer blend materials, whereas aggregated particles of aromatic polyamides of 20 nm to 50 nm were observed in polymer blend material prepared by the coagulation method, each at a magnification of 30000.

One of the concerns regarding the present invention is the improvement in resistance of soluble polyamides toward chemicals by blending aromatic polyamides using the in situ synthesis. The present invention especially demonstrates greatly improved resistance of soluble aliphatic polyamides toward acids upon blending only 3 to 10 weight percent of aromatic polyamides. The improved acid resistance can be evaluated by measuring the weight retention in an acid capable of dissolving the starting polyamide readily, such as formic acid and cresol. Aromatic polyamides, especially for rigid-rod ones, are highly resistant to chemicals due to their extended chain conformations. In the present invention, such a benefit of aromatic polyamides is effectively utilized to enhance the acid resistance of soluble polyamides, by the uniform incorporation of the aromatic polyamides.

Among aromatic polyamides related to the present invention, those having nitro groups as substituents on a phthaloyl moiety are specifically focused on in the present invention in context with acid resistance. Thus, it has also turned out that blending only 3 to 10 weight percent of these aromatic polyamides in a soluble polyamide, in accordance with the present invention, leads to materials which exhibit dramatically improved resistance even toward strong acids such as sulfuric acid after heat treatment. The improved acid resistance can be evaluated by measuring the weight retention following exposure to concentrated sulfuric acid containing more than 95 weight percent of sulfuric acid. In said aromatic polyamides, nitro groups are preferably present on a terephthaloyl group or the meta position of an isophthaloyl group, namely in the form of a nitroterephthaloyl group or a 5-nitroisophthaloyl group. To achieve sufficient resistance toward strong acid, it is preferable for the aromatic polyamide to have more than 0.1 mol, more preferably more than 0.25 mol, of nitroterephthaloyl or 5-nitroisophthaloyl groups per 1 mol of amide bonds in the aromatic polyamide. Specifically, poly(p-phenylene-nitroterephthalamide) [PPD-NT], poly(p-phenylene-5-nitroisophthalamide), poly(m-phenylene-nitroterephthalamide) or poly(m-phenylene-5-nitroisophthalamide) and copolymers thereof may be listed as typical examples for said aromatic polyamides having nitro groups. These polyamides may be synthesized in situ in accordance with the present invention, from monomer combinations between aromatic diacids and aromatic diamines, the former including nitroterephthalic acid and 5-nitroisophthalic acids and the latter including p-phenylenediamine and m-phenylenediamine.

It is important to conduct a heat treatment on the polymer blend materials, comprising aromatic polyamides having nitro groups, to attain sufficient resistance toward strong acids.

The heat treatment is usually performed in a fabricated form of fiber or film at a temperature of over 180° C., preferably over 200° C. and below the melting temperature of the starting soluble polyamide, for 10 hours or more.

DESCRIPTION OF PREFERRED EMBODIMENTS

In order to further illustrate the invention, the following examples are given. It is to be understood that the examples are merely illustrative and not limiting.

EXAMPLE 1

In Situ Synthesis of PPD-T in the Presence of Nylon 6

Into a dry flask equipped with a condenser and a nitrogen inlet were placed 50 ml of NMP, 10 ml of pyridine, 1.0 g of LiCl, 3.0 g of $CaCl_2$, 0.436 g(0.067 mol/l) of PPD and 0.669 g(0.067 mol/l) of TPA. Next, to the mixture were added 8.64 g(144 g/l) of nylon 6 (inherent viscosity=1.0 dl/g) at 165° C. with stirring over 60 minutes, resulting in a solution containing completely dissolved nylon 6. The mixture was allowed to cool to a reaction temperature of 115° C. The resultant mixture was turbid with a yellow color. Then, to this mixture, 2.11 ml(0.134 mol/l) of TPP was added at 115° C. with vigorous agitation. Soon after the addition of TPP the turbid mixture turned into a transparent yellow solution and after 37 minutes, a transparent yellow viscous gel formed. The gel product eventually became too viscous to continue stirring. The product was chopped intensively in a blender jar containing methanol, separated by filtration, washed with boiling methanol repeatedly, then dried at 80° C. in vacuo overnight. Thus, an in situ formed polymer blend material, PPD-T/nylon 6 (10/90) was obtained in powder form. The polymer blend material had an inherent viscosity of 1.7 dl/g.

In the present invention, a fraction in the parentheses means the weight ratio of aromatic polyamide to nylon 6. Inherent viscosity values mentioned in the present invention were determined with a Cannon-Ubbelohde viscometer at 30° C. using 0.1 g/dl solutions in concentrated sulfuric acid.

Degree of Dispersion of the Aromatic Polyamide

The degree of dispersion of the aromatic polyamide was evaluated by the transparency of a sample in film-form observed visually, and the particle size of the aromatic polyamide that can be determined by scanning electron microscopy as follows.

The resultant powder of the polymer blend material was compressed into film at 290° C. for 30 seconds. Thus obtained film of PPD-T/nylon 6 had an improved transparency over a control film prepared from the starting nylon 6. The film containing PPD-T was submerged in liquid nitrogen and then fractured. The fractured surface was coated with platinum, and specimens were investigated on a Hitachi S-430 scanning electron microscope at a magnification of 30000. No aggregated particles of PPD-T larger than 10 nm in diameter were identified by scanning electron micrography.

Acid Resistance of the Polymer Blend Material

The insolubility of the obtained polymer blend material was evaluated by the weight retention following exposure to formic acid which is capable of dissolving nylon 6. Thus, 1.0 g of the powder of the polymer blend material was soaked in 200 ml of formic acid which is capable of dissolving nylon 6, at 25° C. for 3 days with stirring so that dissolution equilibrium was obtained. The weight retention of the powder was 64%. (A control of nylon is completely dissolved by this process.)

EXAMPLE 2

This example was carried out in the same manner described in Example 1 except that the amount of nylon 6 used was changed to 1.44 g(24 g/l). A transparent gel was obtained as in Example 1. Thus, an in situ formed polymer blend material of PPD-T/nylon 6(40/60) was obtained in powder form. This polymer blend material had an inherent viscosity of 2.6 dl/g. Compressing of the polymer blend could not be performed due to its low flowability which was no doubt due to the very high proportion of PPD-T.

EXAMPLE 3

This example was carried out in the same manner described in Example 1 except that the amount of nylon 6 which was changed to 0.32 g (5.3 g/l). A transparent gel was obtained as in Example 1. Thus, an in situ formed polymer blend material of PPD-T/nylon 6 (75/25) was obtained in powder form. The polymer blend material had an inherent viscosity of 3.3 dl/g. Compressing of the polymer blend could not be performed due to its low flowability, again due to too high a proportion of PPD-T.

EXAMPLE 4

In Situ Synthesis of PPD-NT in the Presence of Nylon 6

In a manner similar to that described in Example 1, 8.64 g(144 g/l) of nylon 6 was dissolved into a mixture composed of 50 ml of NMP, 10 ml of pyridine, 1.0 g of LiCl, 3.0 g of $CaCl_2$, 0.367 g (0.057 mol/l) of PPD, 0.716 g (0.057 mol/l)

of TPA at 165° C. with stirring within 60 minutes, resulting in a solution containing completely dissolved nylon 6. Then, the mixture was allowed to cool to a reaction temperature of 115° C. The resultant mixture had a transparent orange appearance. Into this mixture, was added 1.78 ml (0.113 mol/l) of TPP at 115° C. with vigorous agitation. After 44 minutes, a transparent dark yellow viscous gel formed. The gel product eventually became too viscous to continue stirring. The product was washed and dried by working up as above. Thus, an in situ formed polymer blend material of PPD-NT/nylon 6 (10/90) was obtained in powder form. The polymer blend material had an inherent viscosity of 1.7 dl/g.

Degree of Dispersion of the Aromatic Polyamide

The resultant powder of the polymer blend material was compressed into film at 275° C. for 30 seconds. Thus obtained film had an improved transparency over starting nylon 6. The fractured surface of the film was observed on a scanning electron microscope as was described in EXAMPLE 1. No aggregated particles of PPD-NT larger than 10 nm in diameter were observed.

Acid Resistance of the Polymer Blend Material

The insolubility of the thermally treated polymer blend material was evaluated by the weight retention in concentrated sulfuric acid which is capable of dissolving both PPD-NT with no further heat treatment after being compressed in film form, and nylon 6.

The film of the polymer blend material was heated at 210° C. for 24 hours in vacuo. Then, 0.01 g of film was soaked in 5 ml of concentrated sulfuric acid (96%) at 25° C. for 24 hours. The weight retention of the film was 63%. (A control film of nylon 6 completely dissolves in this test.)

EXAMPLE 5

In Situ Synthesis of PBA in the Presence of Nylon 6

In a manner similar to that described in Example 1, 8.09 g (134 g/l) of nylon 6 was dissolved into a mixture composed of 50 ml of NMP, 10 ml of pyridine, 1.0 g of LiCl, 3.0 g of $CaCl_2$, 1.035 g (0.126 mol/l) of p-aminobenzoic acid at 165° C. with stirring within 60 minutes, resulting in a solution containing completely dissolved nylon 6. The resultant mixture had a transparent yellow appearance. Into this mixture, was added 1.98 ml (0.126 mol/l) of TPP at 165° C. with vigorous agitation. After 5 minutes, a transparent light yellow viscous gel formed. The gel product quickly became too viscous to continue stirring. The product was washed and dried by working up as above. Thus, an in situ formed polymer blend material of PBA/nylon 6 (10/90) was obtained. The polymer blend material had an inherent viscosity of 1.5 dl/g.

Degree of Dispersion of the Aromatic Polyamide

The resultant powder was compressed into film at 255° C. for 30 seconds. Thus obtained film had an improved transparency over starting nylon 6. The fractured surface of the film was observed on a scanning electron microscope as was described in EXAMPLE 1. No aggregated particles of PBA larger than 10 nm in diameter were observed.

EXAMPLE 6

In Situ Synthesis of PPD-T in the Presence of Nylon 66

In a manner similar to that described in Example 4, 6.00 g (100 g/l) of nylon 66 (inherent viscosity=1.28 dl/g) was dissolved into a mixture composed of 50 ml of NMP, 10 ml of pyridine, 1.0 g of LiCl, 3.0 g of $CaCl_2$, 0.143 g (0.011 mol/l) of p-phenylenediamine and 0.220 g (0.011 mol/l) of terephthalic acid at 165° C. with stirring within 60 minutes, resulting in a solution containing completely dissolved nylon 66. The resultant mixture had a transparent yellow appearance. Into this mixture, was added 0.70 ml (0.022 mol/l) of TPP at 165° C. with vigorous agitation. After 4 minutes, a transparent amber viscous gel formed. The gel product quickly became too viscous to continue stirring. The product was washed and dried by working up as above, resulting in a powder. Thus, the in situ formed polymer blend material, PPD-T/nylon 66(5/95) was obtained. The polymer blend material had an inherent viscosity of 2.4 dl/g.

Degree of Dispersion of the Aromatic Polyamide

The resultant powder was compressed into film at 300° C. for 30 seconds. Thus obtained film had an improved transparency over starting nylon 66. The fractured surface of the film was observed on a scanning electron microscope as was described in EXAMPLE 1. No aggregated particles of PPD-T larger than 10 nm in diameter were observed.

COMPARATIVE EXAMPLE 1

Preparation of a Polymer Blend Material of PPD-T/Nylon 6 by Coagulation

Both 0.444 g of PPD-T (inherent viscosity=3.1 dl/g) synthesized from p-phenylenediamine and terephthalic acid via the phosphorylation reaction (Higashi method) and 4.0 g of nylon 6 (inherent viscosity=1.0 dl/g) were dissolved in 80 ml of concentrated sulfuric acid at 25° C. The resultant homogeneous solution was poured into deionized water, generating a precipitate. The precipitate was filtered, chopped in a blender jar, and washed with deionized water at 25° C. repeatedly for one week to remove sulfuric acid completely. The precipitate was then dried at 80° C. in vacuo overnight. Thus, a polymer blend material of PPD-T/nylon 6(10/90) was prepared in powder form by coagulation.

Degree of Dispersion of the Aromatic Polyamide

The obtained powder was compressed at 290° C. for 30 seconds, resulting in a film with reduced transparency compared with starting nylon 6. The fractured surface of the film was observed on a scanning electron microscope as was described in EXAMPLE 1. Aggregated particles of PPD-T as much as 50 nm in diameter were observed.

Acid Resistance of the Polymer Blend Material

The obtained powder was soaked in formic acid as is described in EXAMPLE 1 to evaluate insolubility. The weight retention of the polymer blend material was 10%.

COMPARATIVE EXAMPLE 2

Preparation of a Polymer Blend Material of PPD-NT/Nylon 6 by Coagulation

Both 1.112 g of PPD-NT (inherent viscosity=3.3 dl/g) synthesized from p-phenylenediamine and nitroterephthalic acid via the phosphorylation reaction and 10.0 g of nylon 6 (inherent viscosity=1.0 dl/g ) were dissolved in NMP containing 4 wt % LiCl at 115° C. The resultant homogeneous solution was poured into deionized water, generating a precipitate. The precipitate was filtered, chopped in a blender jar, and washed with deionized water at 25° C.

repeatedly for several hours, then dried at 80° C. overnight. Thus a polymer blend material of PPD-NT/nylon 6(10/90) was prepared in powder form by coagulation.

Degree of Dispersion of the Aromatic Polyamide

The obtained powder was compressed at 275° C. for 30 seconds, resulting in a film with reduced transparency compared with starting nylon 6. The fractured surface of the film was observed on a scanning electron microscope as was described in EXAMPLE 1. Aggregated particles of PPD-NT as much as 50 nm in diameter were observed.

Acid Resistance of the Polymer Blend Material

The film of the polymer blend material was heated and then soaked in a concentrated sulfuric acid as is described in EXAMPLE 4. The weight retention of the film was 16%.

COMPARATIVE EXAMPLE 3

The film of the polymer blend material mentioned in EXAMPLE 4 was soaked in a concentrated sulfuric acid as is described in EXAMPLE 4, except for not conducting heat treatment at 210° C. The weight retention of the film was 0%.

COMPARATIVE EXAMPLE 4

The film of the polymer blend material PPD-T/nylon 6(10/90) mentioned in EXAMPLE 1 was heated and then soaked in a concentrated sulfuric acid as is described in EXAMPLE 4. The weight retention of the film was 0%.

We claim:

1. A polymer blend material in the form of a transparent gel comprising a uniformly dispersed aromatic polyamide, a soluble condensation polyamide and a solvent, obtained by the following steps:
   (a) preparing a reaction medium which comprises said solvent, said soluble condensation polyamide dissolved therein, one or more monomers necessary for forming said aromatic polyamide and at least one metal salt; and
   (b) conducting in situ synthesis of said aromatic polyamide via a phosphorylation reaction by the addition of a phosphite compound thereto.

2. A polymer blend material comprising a uniformly dispersed aromatic polyamide in a soluble condensation polyamide, wherein said polymer blend material has a more transparent appearance than the soluble condensation polyamide, and an insoluble portion in formic acid or cresol of said soluble condensation polyamide is more than twice as much as the weight of said aromatic polyamide, obtained by the following steps:
   (a) preparing a reaction medium which comprises a solvent, said soluble condensation polyamide dissolved therein, one or more monomers necessary for forming said aromatic polyamide and at least one metal salt;
   (b) conducting in situ synthesis of said aromatic polyamide via a phosphorylation reaction by the addition of a phosphite compound thereto to form a transparent gel; and
   (c) removing the solvent from the transparent gel without removing the soluble polyamide.

3. A polymer blend material according to claim 1 wherein said monomer for aromatic polyamide is obtained from a combination of an aromatic dicarboxylic acid and an aromatic diamine, the aromatic dicarboxylic acid being at least one member selected from the group consisting of terephthalic acid and isophthalic acid, and the aromatic diamine being at least one member selected from the group consisting of p-phenylenediamine, m-phenylenediamine, 1,5'-diaminonaphthalene, 1,8-diaminonaphthalene, 2,3-diaminonaphthalene, 3,4'-diaminodiphenylether, 4,4'-diaminodiphenylether, 3,4'-diaminodiphenylsulfone, 4,4'-diaminodiphenylsulfone, 3,4'-diaminodiphenyl methane, and 4,4'-diaminodiphenyl methane.

4. A polymer blend material according to claim 2 wherein said polymer blend material is moldable.

5. A polymer blend material according to claim 2 wherein said polymer blend material contains up to 80 weight percent of said aromatic polyamide after removing the solvent.

6. A polymer blend material according to claims 1 or 2 wherein said monomer for aromatic polyamide is at least one aromatic amino acid selected from the group consisting of p-aminobenzoic acid and m-aminobenzoic acid.

7. A polymer blend material according to claims 1 or 2 wherein said aromatic polyamide is a member selected from the group consisting of poly(p-phenyleneterephthalamide), poly(p-benzamide) and copolymers thereof.

8. A polymer blend material according to claims 1 or 2 wherein said soluble condensation polyamide is at least one aliphatic polyamide or copolymer thereof.

9. A polymer blend material according to claim 1 wherein said solvent is at least one member selected from the group consisting of N-methyl-2-pyrrolidinone, N,N-dimethylacetamide and N,N,N',N'-tetramethylurea.

10. A polymer blend material according to claim 1 wherein said phosphite compound is a phosphite having one or more aryl groups.

11. A polymer blend material according to claims 1 or 2 wherein said aromatic polyamide has p-nitroterephthaloyl or 5-nitroisophthaloyl groups.

12. A polymer blend material according to claim 11 wherein said aromatic polyamide has more than 0.1 mole of p-nitroterephthaloyl or 5-nitroisophthaloyl groups per 1 mole of amide bonds in the aromatic polyamide.

13. A polymer blend material according to claim 12 wherein said aromatic polyamide is a member selected from the group consisting of poly(p-phenylene-nitroterephthalamide), poly(p-phenylene-5-nitroisophthalamide), poly(m-phenylene-nitroterephthalamide), poly(m-phenylene-5-nitroisophthalamide, and copolymers thereof.

14. A polymer blend material according to claim 13, wherein said polymer blend material has been thermally treated at a temperature over 180° C.

15. A polymer blend material according to claim 2, wherein said aromatic polyamide has more than 0.1 mole of p-nitroterephthaloyl or 5-nitroisophthaloyl groups per 1 mole of amide bonds in the aromatic polyamide, and said polymer blend material has been thermally treated at a temperature over 180° C.

16. A polymer blend material according to claim 2 wherein said aromatic polyamide is a member selected from the group consisting of poly(p-phenylene-nitroterephthalamide), poly(p-phenylene-5-nitroisophthalamide), poly(m-phenylene-nitroterephthalamide), poly(m-phenylene-5-nitroisophthalamide) and copolymers thereof, and said polymer blend material has been thermally treated at a temperature over 180° C.

17. A polymer blend material according to claim 15 or 16 wherein the weight of the insoluble portion in concentrated sulfuric acid is more than twice as much as the weight of said aromatic polyamide.

18. A process for the production of a polymer blend material comprising the steps:
  (a) preparing a reaction medium which comprises a solvent, a soluble condensation polyamide dissolved therein, one or more monomers necessary for forming an aromatic polyamide and at least one metal salt,
  (b) conducting in situ synthesis of said aromatic polyamide via a phosphorylation reaction by the addition of a phosphite compound thereto, thereby resulting in a transparent gel comprising said aromatic polyamide uniformly dispersed therein, said soluble condensation polyamide and said solvent.

19. A process for the production of a polymer blend material according to claim 18, further comprising the step of removing the solvent from the gel without removing the soluble condensation polyamide to result in a uniform dispersion of said aromatic polyamide.

* * * * *